United States Patent [19]

Tanaka et al.

[11] Patent Number: 5,033,098
[45] Date of Patent: Jul. 16, 1991

[54] METHOD OF PROCESSING CHARACTER BLOCKS WITH OPTICAL CHARACTER READER

[75] Inventors: Hideaki Tanaka, Osaka; Morihiro Katsurada, Nara; Minehiro Konya, Osaka, all of Japan

[73] Assignee: Sharp Kabushiki Kaisha, Osaka, Japan

[21] Appl. No.: 574,386

[22] Filed: Aug. 27, 1990

Related U.S. Application Data

[63] Continuation of Ser. No. 163,709, Mar. 3, 1988, abandoned.

[30] Foreign Application Priority Data

Mar. 4, 1987 [JP] Japan .................................. 62-49169

[51] Int. Cl.⁵ .............................................. G06K 9/34
[52] U.S. Cl. .......................................... 382/9; 382/18; 382/40; 382/57
[58] Field of Search ................... 382/9, 48, 18, 40, 39, 382/57

[56] References Cited

U.S. PATENT DOCUMENTS

| | | | |
|---|---|---|---|
| 3,651,459 | 3/1972 | Hahn | 382/40 |
| 3,969,700 | 7/1976 | Bollinger et al. | 382/9 |
| 3,988,715 | 10/1976 | Mullan et al. | 382/40 |
| 4,058,795 | 11/1977 | Balm | 382/40 |
| 4,466,121 | 8/1984 | Damon et al. | 382/9 |
| 4,594,732 | 6/1986 | Tsuji | 382/9 |
| 4,635,290 | 1/1987 | Tsuji et al. | 382/9 |
| 4,654,873 | 3/1987 | Fujisawa et al. | 382/9 |
| 4,811,412 | 3/1989 | Katsurada | 382/9 |

Primary Examiner—David K. Moore
Assistant Examiner—Joseph Mancuso
Attorney, Agent, or Firm—Irell & Manella

[57] ABSTRACT

To efficiently process character blocks including mutually contacting characters by an optical character reader, not only are histograms prepared in a known manner but after candidate positions are determined from a histogram according to a specified set of criteria, their combinations are considered and the characters which are recognized corresponding to each combination of candidate positions are used to obtain average similarity values. Spellcheck routines and these average similarity values are considered together to identify characters which are contacting each other.

2 Claims, 4 Drawing Sheets

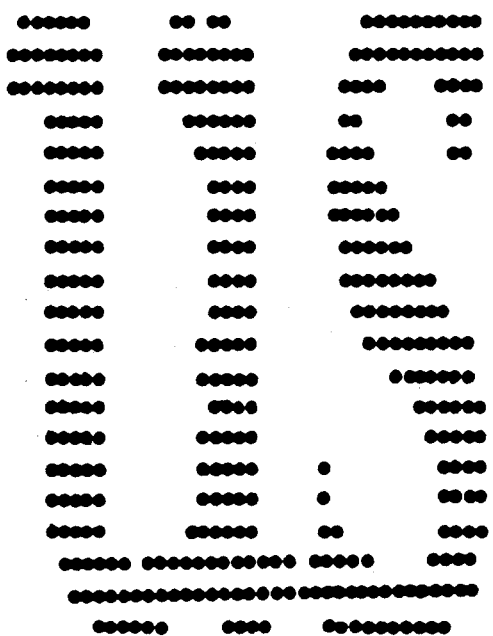
FIG.—1A
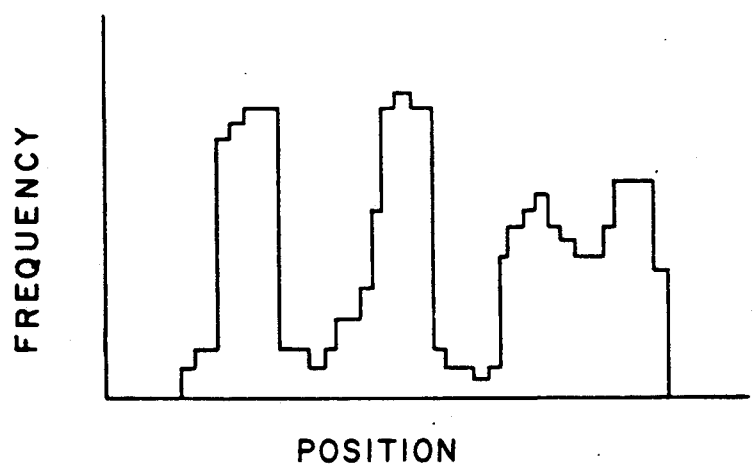
FIG.—1B

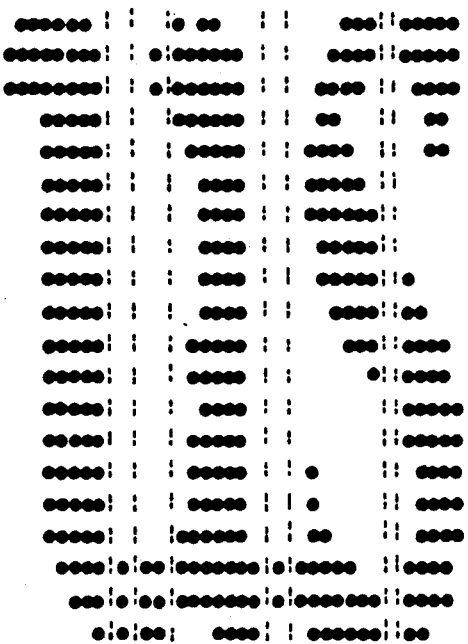
FIG.—IC
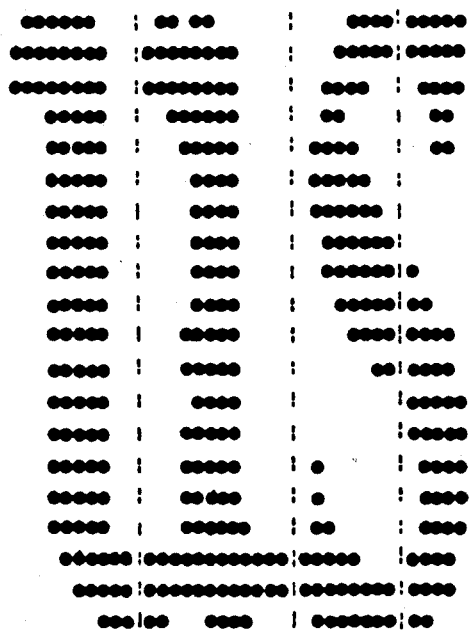
FIG.—ID

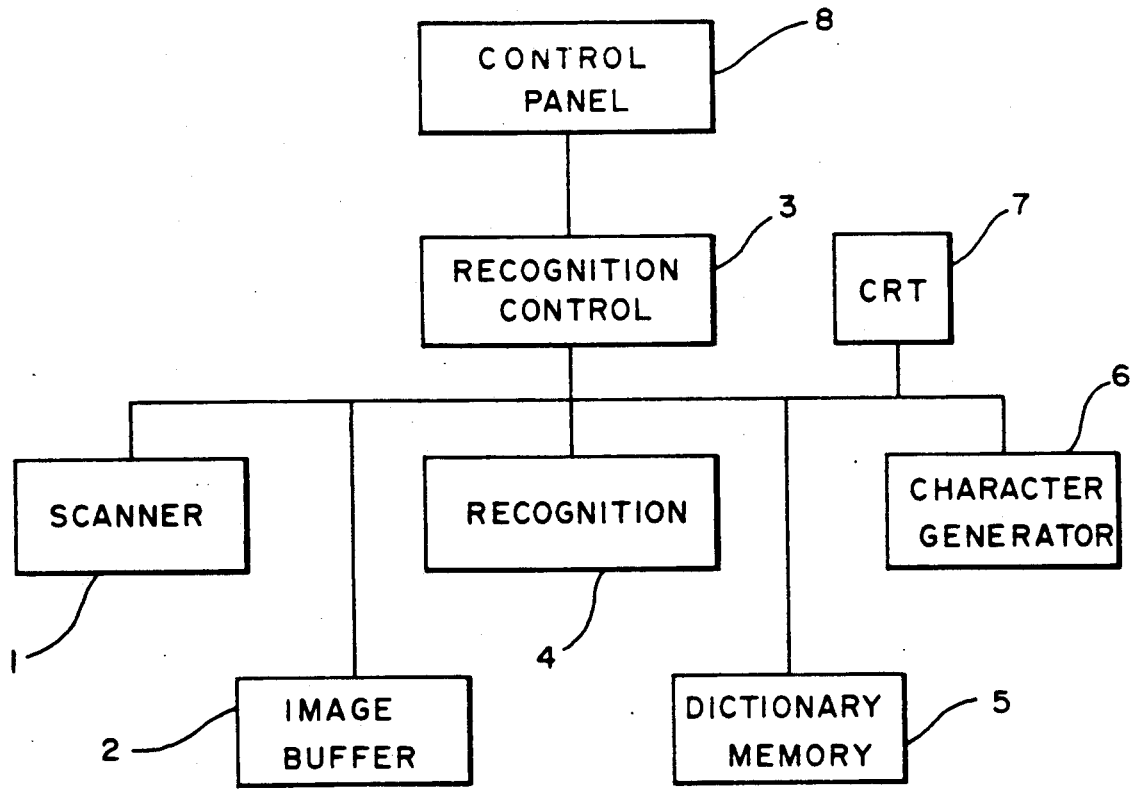
FIG.—1E
FIG.—2

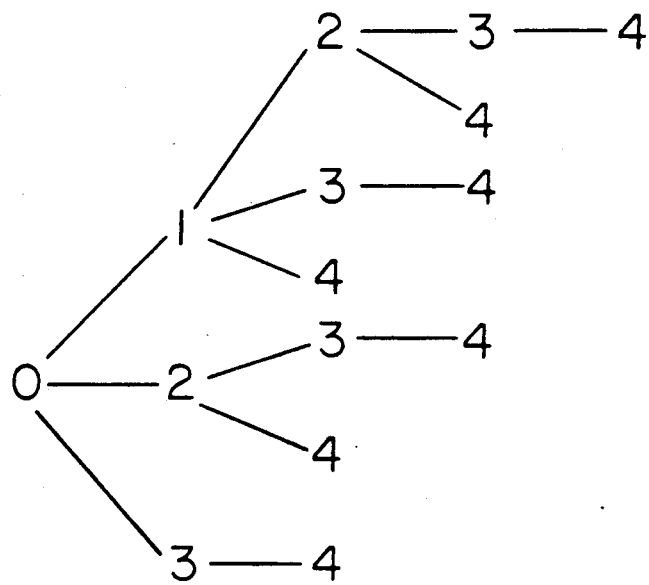
FIG.—3
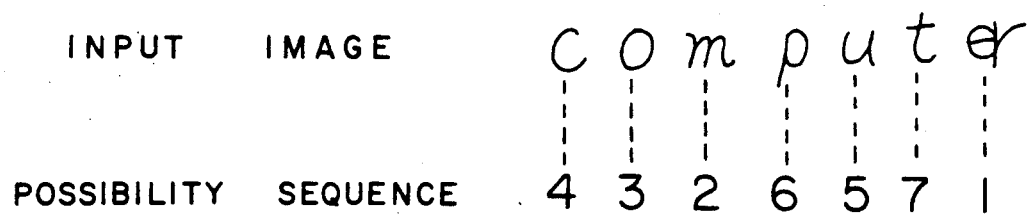
FIG.—4

METHOD OF PROCESSING CHARACTER BLOCKS WITH OPTICAL CHARACTER READER

This is a continuation of application Ser. No. 163,709 filed Mar. 3, 1988, now abandoned.

BACKGROUND OF THE INVENTION

This invention relates to an optical reader for alphanumeric characters and more particularly to a method of processing character blocks, or groups of mutually contacting characters by using such an optical character reader.

When an optical alphanumeric character reader is used to read (scan) a document, problems arise if there are characters which touch each other. In such a situation, conventional optical character readers would attempt to identify characters by breaking up the character block where the histogram in the perpendicular direction to the line takes on a value smaller than a predetermined threshold value. Character blocks are frequently broken up incorrectly by this method and the overall efficiency of character identification becomes extremely low if there are many mutually contacting characters in the original. As a practical matter, detection of contacting characters itself is a very difficult problem.

SUMMARY OF THE INVENTION

It is therefore an object of the present invention to provide a method of breaking up character blocks such that sentences and words containing mutually contacting characters can be read correctly.

According to a method embodying the present invention, a histogram is obtained from an image of a character or a character block extracted from a pictorial image in the direction perpendicular to the line and likely positions where the image may be broken up are determined from such a histogram according to a set of criteria such that the frequency value represented by the histogram must be a local minimum and that the boundary between two characters cannot be too close to the ends of the image. Once such likely positions (referred to as candidate positions) are determined, all their combinations are considered and characters are recognized according to each combination of these candidate positions. The average similarity value is calculated and identification is made in view of such values.

According to another method embodying the present invention, word images are extracted from a pictorial image and individual character images are extracted from each word image. After individual characters in a word are identified, a spellcheck is performed and if the checked word is not found in a reference dictionary or if a word contains a character image which is wider than a predetermined maximum value, each character image is assigned a possibility number according to its length, indicating how likely the image represents a character block rather than a single character. A histogram is obtained similarly as explained above and combinations of candidate positions are considered in the order of these possibility numbers. Spellchecks are performed for each combination in the order of their associated average similarity values.

In short, not only histograms of the type used in conventional methods but also character recognition and spellcheck routines are used in combination according to the present invention for breaking up character blocks correctly in a much more efficient manner.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 1A-1E are drawings for showing a method of the present invention for determining candidate positions by way of an example, FIG. 2 is a block diagram of an optical character reader which uses the method of the present invention, FIG. 3 is a diagram showing a method of determining combinations of candidate positions by expansion for the case of FIG. 1E, and FIG. 4 is an example of input image and possibility numbers assigned to each character and character block according to a method of the present invention.

DETAILED DESCRIPTION OF THE INVENTION

With reference to FIG. 2 which is a block diagram of an optical character reader using a method embodying the present invention, character arrays on a document sheet is read (scanned) by a scanner 1 and the image data thus received are temporarily stored in an image buffer 2. A recognition control unit 3 such as a microprocessor extracts a line image from the pictorial image in the image buffer 2, extracts the image of an individual character from this line image and judges the characteristics of this character. A recognition unit 4 recognizes the character by matching these characteristics with font patterns stored in a dictionary memory 5 and converts it into a JIS (Japanese Industrial Standard) code. The recognized result is displayed on a cathode ray tube CRT 7 by using a font pattern from a character generator 6. The operation of the CRT 7 is controlled by commands from a control panel 8. The optical character reader also includes a spellcheck dictionary memory (not shown).

A method embodying the present invention is described next by way of an example with reference to FIGS. 1A-1E. Let us assume that a group of mutually contacting characters, or a character block consisting of roman characters "u" and "s" as shown in FIG. 1A was encountered when individual characters were being extracted from a line image taken out of a binary pictorial image received from the image scanner. If hj is the number of black dots on the jth vertical scanning line, or counted by scanning in the vertical direction at the jth horizontal position, a histogram shown in FIG. 1B may be drawn to represent the numbers hj from one position where h is zero to the next position where h is again zero. From a histogram thus generally obtained or from a set of numbers hj (j=1 to n) from which the histogram is obtained, what is herein referred to as a candidate position is determined, according to one embodiment of the present invention, as a position represented by the position index j such that the following conditions are all satisfied: $h_{j-1} \geq h_j \leq h_{j+1}$, $h_j \leq 10$ and $5 \leq j \leq n-5$. By the candidate position is meant a position which, from the appearance of the histogram, seems like a boundary between two separate characters although it may not be so and hence requires a further investigation. The last of the three conditions is based on the consideration that each character has a minimum width (of 5 spaces in this example). The other conditions say that the number of dots at a boundary must be no greater than 10 and must be no greater than at its neighboring positions on both sides.

If the conditions considered above are applied to the histogram of FIG. 1B, seven candidate positions are found as indicated by dotted lines in FIG. 1C. Since more than one boundary cannot be present within a certain minimum horizontal distance, if two or more candidate positions are within such a minimum horizontal distance (say, 8 bits), only the position within this distance at which the histogram is the lowest remains as a candidate and the rest are ignored. The remaining candidate positions are shown in FIG. 1D and they are numbered sequentially for the convenience of analysis from the left, inclusive of the positions at both ends of the character block, its left-hand beginning position being "0". This is shown in FIG. 1E.

Next, it is assumed that the widths of characters are less than a certain threshold value and a table is formed for showing which candidate positions are within this threshold value to the right-hand side of each of them. Table 1 shows such a table obtained from FIG. 1E if the threshold value is 32 bits. It shows, for example that Candidate Positions 2, 3 and 4 are within 32 bits to the right-hand side of Candidate Position 1.

TABLE 1

| Candidate Position | Candidate Positions Within Threshold Value | | |
|---|---|---|---|
| 0 | 1 | 2 | 3 |
| 1 | 2 | 3 | 4 |
| 2 | 3 | 4 | |
| 3 | 4 | | |

Next, candidate positions are considered according to Table 1. Attempts are made to identify each portion of the image as a character and similarity value of each portion to a known character is calculated by any known method. Tables 2 and 3 show the identified characters and calculated similarity values to these identified characters for the case of the examples of FIG. 1E and Table 1.

TABLE 2

| Candidate Position | Recognized Characters | | |
|---|---|---|---|
| 0 | l | u | w |
| 1 | l | k | b |
| 2 | ; | s | |
| 3 | : | | |

TABLE 3

| Candidate Position | Similarity Values | | |
|---|---|---|---|
| 0 | 0.87 | 0.95 | 0.73 |
| 1 | 0.93 | 0.70 | 0.69 |
| 2 | 0.91 | 0.94 | |
| 3 | 0.92 | | |

Table 2 means, for example, that the portion of the line image between Candidate Positions 0 and 1 is best identifiably as "1" and Table 3 means that its similarity value to "1" is 0.87 according to a preselected method of calculation.

Next, Table 1 is used to consider all possible combinations of candidate positions. FIG. 3 shows for the case of FIG. 1E how seven combinations can be identified by a known expansion method. These combinations are written out and numbered for identification as shown in Table 4.

TABLE 4

| | Combinations of Candidate Positions | | | | |
|---|---|---|---|---|---|
| No. 1 | 0 | 1 | 2 | 3 | 4 |
| No. 2 | 0 | 1 | 2 | 4 | |
| No. 3 | 0 | 1 | 3 | 4 | |
| No. 4 | 0 | 1 | 4 | | |
| No. 5 | 0 | 2 | 3 | 4 | |
| No. 6 | 0 | 2 | 4 | | |
| No. 7 | 0 | 3 | 4 | | |

Then, for each combination shown in Table 4, the results of identification and the average similarity value is calculated from Tables 2 and 3. Table 5 shows this result and also lists the order of average similarity.

TABLE 5

| | Result | Average Similarity Value | Sequence |
|---|---|---|---|
| No. 1 | ll;: | 0.907 | 4 |
| No. 2 | lls | 0.913 | 3 |
| No. 3 | lk; | 0.83 | 5 |
| No. 4 | lb | 0.78 | 7 |
| No. 5 | u;: | 0.926 | 2 |
| No. 6 | us | 0.945 | 1 |
| No. 7 | w: | 0.825 | 6 |

If the results of identification are rearranged in the order of average similarity, one obtains Table 6.

TABLE 6

| Order | Result |
|---|---|
| 1 | us |
| 2 | u;: |
| 3 | lls |
| 4 | ll;: |
| 5 | lk: |
| 6 | w: |
| 7 | lb |

One concludes from this analysis that the character block of FIG. 1E is probably "us".

Should only one pair of characters in a word be detected as being in contact with each other to form a character block, a spellcheck procedure could be performed on each of the candidate character arrays obtained by the routine described above. In reality, however, it is extremely difficult to detect contacting characters and there are many situations where more than one character block appears in a word. According to another method embodying the present invention, a spellcheck procedure is used as follows.

When a word which is not found in a reference dictionary is encountered by a spellcheck or contains a character wider than a predetermined maximum width, such a word is assumed to contain a character block. Let us consider the example of character array shown in FIG. 4 which contains two characters "e" and "r" touching each other. When this word is encountered and characterized as containing a character array, the width of each character and character block is compared and possibility numbers are sequentially assigned to them as shown in FIG. 4 on the basis of their width, indicating which of them are more likely to be a character block. In this example, the character block "er", which is indeed a character block and is the widest, is assigned "1" as the possibility number and the character "m", which is identified as the widest among the rest, is assigned "2".

Thereafter, the procedures described above are carried out with respect to each of the characters and character groups to identify their candidate positions. Table 7 shows for the case of FIG. 4 how each character and character block is identified when considered as a whole, when only one of the candidate positions is used, and so forth. This shows, for example, that "er" is identified as "m" when considered as a whole, that "m" is identified as "rn" if broken up into two parts at one of its candidate positions, that no candidate position can be found regarding "p" and "t" and that the character block "er" can also be identified as "ml" and "cm".

TABLE 7

| 0 | First Identification | c | o | m | p | u | t | m |
|---|---|---|---|---|---|---|---|---|
| 1 | First Candidate Position | ll | c) | rn | * | ll | * | er |
| 2 | Second Candidate Position | | Cl | | | u. | | ml |
| 3 | Third Candidate Position | | | | | | | cm |

*indicates no identifiable candidate position.

Each character and character block is analyzed sequentially in the order of possibility number by expanding at character positions as explained above. Table 8 shows the result of such expansion in the case of FIG. 4 and Table 7. In Table 8, the character arrays indicate the expansions and the corresponding numerals indicate the order of candidacy at the left-hand end of Table 7. Thus, for example, the expansion "computer" is obtained by considering "c", "o", "m", "p", "u" and "t" individually as a whole and by using the first candidate position to break up the character block into "e" and "r".

TABLE 8

| 0 | 0 | 0 | 0 | 0 | 0 | 0 | computm |
|---|---|---|---|---|---|---|---|
| 0 | 0 | 0 | 0 | 0 | 0 | 1 | computer |
| 0 | 0 | 0 | 0 | 0 | 0 | 2 | computml |
| 0 | 0 | 0 | 0 | 0 | 0 | 3 | computcm |
| 0 | 0 | 1 | 0 | 0 | 0 | 1 | cornputer |

Finally, a spellcheck is done on these expanded words and the first combination considered as being spelled correctly is presented as the "correct" word. In the example of Table 8, since the character array "computm" is not present in the dictionary memory but "computer" is, the combination "computer" on the second line is interpreted to be correct.

What is claimed is:

1. A method of processing character blocks by an optical alphanumeric character reader comprising the steps of
    extracting a word image from a pictorial image,
    extracting images of individual characters from said word image,
    identifying each of said individual character images to obtain a character array,
    carrying out a spellcheck of said obtained character array by comparing the obtained character array with words stored in a reference dictionary for judging whether or not the character array matches with said words in said reference dictionary,
    assigning possibility numbers, if said obtained character array is not found as a word in a reference dictionary by said spellcheck or if any of said individual characters has an image longer than a predetermined maximum width, individually to each of characters and character blocks of said obtained character array in the order of the widths thereof,
    obtaining a histogram from the image of each of said characters and character blocks, said histogram being taken in the perpendicular direction to the line of said character block,
    obtaining from said histogram candidate positions where the frequency value is no larger than a predetermined value by excluding positions within a predetermined width from both ends of said character block and, if a plurality of said candidate positions are within a predetermined minimum width, considering only one of said plurality of said candidate positions having the smallest frequency value,
    determining for each combination of said candidate positions a set of recognized characters and an average similarity value for said recognized characters,
    forming combinations of said candidate positions sequentially in the order of said possibility numbers,
    performing spellchecks on said combinations sequentially in the order determined by said average similarity values, and
    selecting the first word found by said spellcheck.

2. The method of claim 1 wherein each of said candidate positions is selected where the frequency value is smaller than those at adjacent positions thereof.

* * * * *